2,894,833

STAINLESS STEEL FOR WELD

George E. Linnert, Timonium, and Robert M. Larrimore, Jr., Baltimore, Md., assignors to Armco Steel Corporation, a corporation of Ohio No Drawing. Application February 9, 1955
Serial No. 487,213

9 Claims. (Cl. 75—128)

Our invention relates to the art of welding and more particularly is concerned with an austenitic stainless steel weld, a non-magnetic welded article, a weld rod and the weld rod metal.

One of the objects of our invention is the provision of welded articles and products such as armor plate, underwater detection apparatus, mine sweeping apparatus and the like, which are entirely non-magnetic and yet which are strong, tough and crack-free at the weld.

A further object is the provision of a weld deposit or weld which is strong, ductile, non-magnetic and yet which is free of micro-fissures in use at low temperature, room temperature or elevated temperatures, i.e., temperatures on the order of 1000° to 1800° F. under conditions of stress and vibration.

Another object is the provision of a weld rod, a weld electrode and a rod or electrode core wire suited to the production of the welded articles and products and the weld deposits of fissure-free and non-magnetic characteristics aforesaid, which rod, electrode and core wire are produced in efficient, reliable manner with a minimum of wastage and with full assurance of nonmagnetic qualities in the weld.

Other objects of our invention in part will be obvious and in part pointed out during the course of the description which follows.

Our invention accordingly resides in the combination of elements, composition of ingredients and mixture of materials as described herein, the scope of the application of which appears from the claims at the end of this specification.

As conducive to a better understanding of certain features of our invention it may be noted at this point that in the welding art it is common practice to employ stainless steel weldments which are of a 2-phase austenitic-ferritic structure. And it is common practice among the manufacturers of the chromium-nickel stainless steel welding electrodes to adhere to composition specifications which will produce the desired small amount of free ferrite in the weld which otherwise would be fully austenitic. Such welds and rods may comprise 12% to 30% chromium, 4% to 20% nickel, with small amounts of manganese, silicon and carbon, with the remainder iron. Minor amounts of other ingredients may be included for special purposes. Experience has shown that the free ferrite constituent effectively prevents the micro-fissuring or hot-cracking which commonly is found in the austenitic welds, particularly those involving large sections, as, for example, in the welding of armor plate.

Unfortunately, however, there are many welded structures in which free ferrite or delta ferrite may not be tolerated in the weld. It has been found, for example, that when certain of these structures such as gas turbines, steam plant equipment, retorts and pressure vessels for the petroleum industry, are subjected to elevated temperature conditions for substantial periods of time, the delta ferrite is inclined to transform to an objectionable sigma phase. Strength, particularly at the elevated temperatures, immediately suffers.

Moreover it is found that in many classes of service a weld with any free ferrite whatever may not be tolerated because of the consequent magnetic effects. Thus, for example, in mine sweeping apparatus, underwater detection apparatus, various electrical instruments and the like, the austenitic-ferritic weldments of the prior art are not satisfactory because those weldments are undesirably magnetic.

Although stainless steel weldments which are wholly austenitic are well known in the prior art, we find that this type of weld invariably contains micro-fissuring, the extent of which differs only in degree. And when the wholly austenitic stainless steel weld is subjected to rigid restraint, the micro-fissures propagate to form cracks that are visible to the naked eye. Such defective welds are found in the welding of large sections of armor plate and in the welding of heavy earth-moving equipment. The propagation of the micro-fissures to form visible cracks is readily demonstrated in an all-weld-metal tensile test. Open fissures are seen on the distorted surface of the specimen and in the tensile fracture, itself. And where many fissures are present in the specimen the elongation values are lowered because of the many opportunities for fracture initiation and also because of the decrease in the effective or sound cross-sectional area. And even where only a few fissures are visible we find that the elongation values are not an accurate index to the extent of cracking.

It will be seen that the fabricators are faced with the dilemma: They cannot fully rely upon the 2-phase austenitic-ferritic chromium-nickel stainless steel weldments of the prior art because of the undesirable magnetic properties resulting from the presence of ferrite, and yet they cannot fully rely upon the wholly austenitic chromium-nickel stainless steel welds because of the inherent tendency toward the development of micro-fissures, with resultant crack propagation particularly in actual use, all with consequent failure.

An object of our invention is the provision of a chromium-nickel stainless steel weld which is wholly austenitic with complete freedom from magnetic effects and yet which is free of micro-fissures and the consequent incipient cracking both during weld formation and in use. Another object is the provision of a weld rod and rod metal which assure the formation of sound, crack-free, non-magnetic, austenitic stainless steel welds of the character noted, in which due allowance is provided for loss by oxidation and dilution effects commonly encountered.

Referring now more particularly to the practice of our invention we find that the formation of micro-fissures (hot cracking) in the austenitic chromium-nickel stainless steel welds come about as a result of the segregation of one or more low-melting compounds or constituents, this within the austenite grain boundaries. These various low-melting constituents seem to comprise the residual elements, silicon, sulphur and phosphorus, found in all chromium-nickel stainless steels. Moreover, certain of the special alloying elements, such as columbium and tantalum, where employed, likewise form low-melting constituents which are inclined to segregate in the grain boundaries of the austenite. When the low-melting constituents reach a certain critical concentration the boundary is easily fissured by contraction stresses. Even where sulphur, phosphorus and silicon are held to their lowest practical minimum values, we find that there is sufficient of the low-melting constituent in the grain boundaries of the austenitic weld deposit to cause the formation of micro-fissures.

In accordance with the practice of our invention we add a large amount of manganese to the weld metal.

Apparently the manganese addition serves to change the nature of the compounds or constituents. In any event, in some way not fully understood by us there no longer is a segregation of low-melting compounds or low-melting constituents at the austenite grain boundaries. The weld is no longer suceptible to micro-fissuring and incipient cracking either in laying down the weld or in use of the welded structure at room temperature or elevated temperature. It is found that the amount of manganese required is highly critical, at least 5.5% manganese being essential. Lower manganese contents do not give austenitic chromium-nickel stainless steel weld deposits which are consistently free of incipient cracking.

The crack-resisting non-magnetic austenitic stainless steel weld of our invention essentially consists of 12% to 30% chromium, 7% to 35% nickel, 5.5% to 13% manganese, and remainder iron. Where desired, there may be included in the composition of the weld silicon in the amount of 0% to 3%, molybdenum in the amount of 0% to 4%, columbium and tantalum taken together in the amount of 0% to 1.5%, titanium in the amount of 0% to 1.5% and copper in the amount of 0% to 5%, all for special purposes. The carbon content preferably is low, this usually being on the order of .08% as a maximum, although in the higher nickel grades of austenitic stainless steel weld metal it may amount to .20% maximum or even .25% maximum. The correlation between the chromium, nickel, manganese and other ingredients of the steel is such that a wholly austenitic structure is had. The metal is non-magnetic, i.e., it has a magnetic permeability value not exceeding 2.0 at 100 Oersteds field strength.

The highly critical character of the composition of our crack-resisting non-magnetic austenitic stainless steel welds is forcefully revealed in a series of tests conducted by us on a number of samples, each of five typical heats of ³⁄₁₆" welding electrode core wire analyzing about 25% chromium, 20% nickel, and remainder iron. This core wire was coated with a conventional welding flux in which there was incorporated differing amounts of powdered electrolytic manganese for the purpose of securing progressive increases in the manganese content of the weld specimens. And the resulting welds were subjected to tensile test, with careful observation as to cracking along the sides of the tensile specimens. Full identification of the manganese content of the various specimens made from each of the five heats of core wire and the results of the tensile tests are given in the following table:

*Report of susceptibility to cracking of non-magnetic austenitic 25–20 chromium-nickel stainless steel weld metal*

| Core Wire Heat | Weld Metal Manganese Content | Average Weld Metal Elongation in Tensile Test | | Weld Metal Soundness |
| --- | --- | --- | --- | --- |
| | | No. Specimens | Percent in 2" | |
| 10469 | 1.96 | 5 | 38.5 | Cracking. |
| | 3.16 | 2 | 30.0 | No Cracking. |
| | 5.87 | 2 | 38.0 | Do. |
| | 6.91 | 3 | 39.0 | Do. |
| 10495 | 1.96 | 5 | 35.7 | Cracking. |
| | 3.15 | 2 | 32.5 | Do. |
| | 4.15 | 2 | 38.0 | Do. |
| | 5.87 | 3 | 37.0 | No Cracking. |
| 11227 | 1.92 | 5 | 35.0 | Cracking. |
| | 5.86 | 3 | 36.0 | No Cracking. |
| 21201 | 1.82 | 5 | 29.5 | Cracking. |
| | 3.26 | 2 | 39.7 | Do. |
| | 3.88 | 2 | 37.7 | No Cracking. |
| | 7.18 | 3 | 36.5 | Do. |
| 30059 | 2.48 | 5 | 37.1 | Cracking. |
| | 3.35 | 2 | 32.5 | Do. |
| | 5.87 | 3 | 37.5 | No Cracking. |

It will be seen from the results given above that all low manganese weld specimens of all five different heats of core wire contained incipient cracking characteristics. Actually, it will be seen that even where the manganese content amounted to as much as 3% there was evidence of cracking in all welds except one, i.e., the weld metal made from core wire heat 10469 with manganese content 3.16%. Even with weld metal of manganese content of 4.5% (core wire heat 10495) cracking was observed. This suggests the impossibility of precisely determining the reason for cracking and exactly controlling it by varying the composition balance within the composition range of the melting specifications. Where, however, there is employed a manganese content of 5.5% or more, freedom from cracking is positively assured; all specimens reported above containing 5.86% manganese or more evidenced no susceptibility to cracking.

Although further tests on hte 25–20 austenitic chromium-nickel stainless steel weld metal reveal that welds having higher manganese contents, manganese contents as high as 20.67%, evidenced no micro-cracking, we find that weld metal of this very high manganese content suffers a loss of ductility. Moreover, we find that the weld metal with 20.67% manganese is not wholly austenitic. There is evidence that free or delta ferrite forms, some of which further transforms to sigma phase. The formation of these phases is felt to account for the decrease in ductility. Actually, we find that a modified Type 310 weld with 14.04% manganese, although ductile and free of incipient cracking, was not wholly austenitic, and was very slightly magnetic. Accordingly, therefore, the manganese content of our austenitic chromium-nickel stainless steel weld metal is seen to be highly critical with a minimum of 5.5% and a maximum of 13%.

A number of austenitic chromium-nickel stainless steel welds according to our invention analyze, for one, 19% to 21% chromium, 10% to 12% nickel, 5.5% to 13% manganese, and remainder iron. Another analyzes 22% to 24% chromium, 12% to 15% nickel, 5.5% to 13% manganese, .20% maximum carbon, and remainder iron. A third analyzes 24% to 26% chromium, 19% to 22% nickel, 5.5% to 13% manganese, .25% maximum carbon, and remainder iron. A further weld analyzes 16% to 20% chromium, 10% to 14% nickel, 5.5% to 13% manganese, 2% to 4% molybdenum, and remainder substantially iron. Another analyzes 17% to 19% chromium, 9% to 12% nickel, 5.5% to 13% manganese, .08% maximum carbon, with columbium and tantalum together amounting to 10 times the carbon content, and remainder iron. Still another analyzes 17% to 19% chromium, 8% to 11% nickel, 5.5% to 13% manganese, .08% maximum carbon, titanium 8 times the carbon content, and remainder iron.

We find that bare welding electrodes or weld rods, to deposit austenitic chromium-nickel stainless steel weld metal of the required 5.5% minimum manganese content, must contain at least 7.1% magnanese, this in order to allow for oxidation losses (10%) and for the diminution of manganese as a result of dilution of the base metal. Thus the bare welding electrode or weld wire for inert gas shielded welding essentially consists of 12% to 30% chromium, 7% to 35% nickel, 7.1% to 16.7% manganese, with silicon 0% to 3%, molybdenum 0% to 4%, copper 0% to 5%, columbium and tantalum 0% to 1.5%, titanium 0% to 1.5% and remainder iron, with carbon content preferably not exceeding .25%.

Similarly, covered welding electrodes, in which the required alloying elements may be present entirely in the core wire or their equivalents may be included in the flux coating of the wire, essentially consist of 12% to 30% chromium, 7% to 35% nickel, 8.5% to 20.0% manganese, 0% to 3% silicon, 0% to 4% molybdenum, 0% to 5% copper, 0% to 1.5% columbium and tantalum taken together, 0% to 1.5% titanium, and remainder iron. The total carbon content should not exceed about .30%.

A specific example of covered electrode made in accordance with our invention analyzes 19% to 21% chromium, 10% to 12% nickel, 8.5% to 20% manganese, and remainder substantially all iron. Another coated electrode analyzes 22% to 24% chromium, 12% to 15% nickel, 8.5% to 20% manganese, and remainder iron. Still another analyzes 24% to 26% chromium, 19% to 22% nickel, 8.5% to 20% manganese, .25% maximum carbon, and remainder substantially all iron. A fourth coated electrode is of the composition 16% to 20% chromium, 10% to 14% nickel, 8.5% to 20% manganese, 2% to 4% molybdenum, and remainder iron. A fifth electrode is of the composition 17% to 19% chromium, 9% to 12% nickel, 8.5% to 20% manganese, .08% maximum carbon content, columbium and tantalum together 10 times the carbon content, and remainder iron.

Submerged-arc welding electrode wire, in accordance with our invention, analyzes 12% to 30% chromium, 7% to 35% nickel, 14.7% to 23.1% manganese, 0% to 3% silicon, 0% to 4% molybdenum, 0% to 5% copper, 0% to 1.5% columbium and tantalum, 0% to 1.5% titanium, and remainder substantially all iron. We find that in such a wire the higher manganese contents properly allow for the dilution and oxidation encountered.

Our electrode or filler metal in its broadest definition therefore analyzes 12% to 30% chromium, 7% to 35% nickel, 7.1% to 23.1% manganese, 0% to 3% silicon, 0% to 4% molydenum, 0% to 5% copper, 0% to 1.5% titanium, and remainder substantially all iron.

Thus it will be seen that we have provided in our invention an austenitic chromium-nickel stainless steel weld which not only is free of magnetic effects but is resistant to incipient cracking both as initially laid down and in use under the various conditions encountered at room and at elevated temperatures. Welded structures such as underwater detection apparatus, non-magnetic mine sweeping apparatus, made in accordance with our invention are free of micro-fissuring at the weld. Moreover, steam generating equipment, gas turbines, retorts and pressure vessels for the petroleum industries, as well as like equipment designed to be operated at elevated temperatures, are crack-free and wholly austenitic. Delta ferrite which commonly is found in the crack-free welds of the prior art is eliminated, thereby precluding transformation to sigma phase with loss of physical properties in use. Also it will be seen that we provide welding electrodes, wire for inert gas shielded welding, electrode core wire and indeed austenitic chromium-nickel stainless steel, all of which are particularly suited to the consistent, reliable and repeated production of high quality welds, welds which are ductile, non-magnetic and yet free of incipient cracking.

As many possible embodiments as may be made of our invention and as many changes may be made of the embodiments hereinbefore set forth, it will be understood that all matter described herein is to be interpreted as illustrative and not by way of limitation.

We claim as our invention:

1. A weld electrode for making a non-magnetic, crack-resistant weld, said electrode essentially consisting of 19% to 21% chromium, 10% to 12% nickel, 8.5% to 20% manganese, and remainder substantially all iron.

2. A weld electrode for making a non-magnetic, crack-resistant weld, said electrode essentially consisting of 22% to 24% chromium, 12% to 15% nickel, 8.5% to 20% manganese, carbon .20% maximum, and remainder substantially all iron.

3. A weld electrode for making a non-magnetic, crack-resistant weld, said electrode essentially consisting of 24% to 26% chromium, 19% to 22% nickel, 8.5% to 20% manganese, .25% maximum carbon, and remainder substantially all iron.

4. A weld electrode for making a non-magnetic, crack-resistant weld, said electrode essentially consisting of 16% to 20% chromium, 10% to 14% nickel, 2% to 4% molybdenum, 8.5% to 20% manganese, and remainder substantially all iron.

5. A weld electrode for making a non-magnetic, crack-resistant weld, said electrode essentially consisting of 17% to 19% chromium, 9% to 12% nickel, 8.5% to 20% manganese, .08% maximum carbon, columbium and tantalum 10 times the carbon content, and remainder substantially all iron.

6. Submerged-arc welding electrode wire for making a non-magnetic, crack-resistant weld, said wire essentially consisting of 12% to 30% chromium, 7% to 35% nickel, 14.7% to 23.1% manganese, 0% to 3% silicon, 0% to 4% molybdenum, 0% to 5% copper, 0% to 1.5% columbium and tantalum, 0% to 1.5% titanium, and remainder substantially all iron.

7. Stainless steel weld wire for making a non-magnetic, crack-resistant weld, said wire essentially consisting of 19% to 21% chromium, 10% to 12% nickel, 7.1% to 20.0% manganese, and remainder substantially all iron.

8. Stainless steel weld wire for making a non-magnetic, crack-resistant weld, said wire essentially consisting of 22% to 24% chromium, 12% to 15% nickel, 7.1% to 16.7% manganese, .20% maximum carbon, and remainder iron.

9. Stainless steel weld wire for making a non-magnetic, crack-resistant weld, said wire essentially consisting of 24% to 26% chromium, 19% to 22% nickel, 7.1% to 16.7% manganese, .25% maximum carbon, and remainder substantially all iron.

References Cited in the file of this patent
UNITED STATES PATENTS

| | | |
|---|---|---|
| 2,156,298 | Leitner | May 2, 1939 |
| 2,156,307 | Rapatz | May 2, 1939 |
| 2,240,672 | Scherer et al. | May 6, 1941 |

FOREIGN PATENTS

| | | |
|---|---|---|
| 1,078,772 | France | May 12, 1954 |

OTHER REFERENCES

Merritt: Iron Age, vol. 157, No. 23, June 6, 1946, pages 66–70. Published by the Chilton Co., Inc., Philadelphia, Pa.